(12) United States Patent
Hartman et al.

(10) Patent No.: US 8,897,564 B2
(45) Date of Patent: Nov. 25, 2014

(54) METHOD AND SYSTEM FOR AUTOMATIC IDENTIFICATION AND ORIENTATION OF MEDICAL IMAGES

(75) Inventors: Keith W. Hartman, Redwood City, CA (US); Julian Marshall, Los Altos, CA (US); Alexander C. Schneider, Sunnyvale, CA (US); Jimmy R. Roehrig, Palo Alto, CA (US)

(73) Assignee: Hologic Inc, Bedford, MA (US)

( * ) Notice: Subject to any disclaimer, the term of this patent is extended or adjusted under 35 U.S.C. 154(b) by 2461 days.

(21) Appl. No.: 11/634,434

(22) Filed: Dec. 5, 2006

(65) Prior Publication Data
US 2007/0076938 A1    Apr. 5, 2007

Related U.S. Application Data

(63) Continuation of application No. 09/721,347, filed on Nov. 22, 2000, now Pat. No. 7,146,031.

(51) Int. Cl.
*G06K 9/00*    (2006.01)
*G06T 7/00*    (2006.01)
(52) U.S. Cl.
CPC ............ *G06T 7/0042* (2013.01); *G06T 7/0012* (2013.01); *G06T 2207/30068* (2013.01)
USPC ...................................................... 382/182

(58) Field of Classification Search
CPC ............... G06T 7/2093; G06T 7/204; G06T 2207/30224; A63B 2024/0056
USPC .......................... 382/128, 129, 130, 131, 132
See application file for complete search history.

(56) References Cited

U.S. PATENT DOCUMENTS

| | | | | |
|---|---|---|---|---|
| 4,672,683 | A * | 6/1987 | Matsueda | 382/305 |
| 5,592,374 | A * | 1/1997 | Fellegara et al. | 705/3 |
| 5,917,929 | A * | 6/1999 | Marshall et al. | 382/128 |
| 6,424,732 | B1 * | 7/2002 | Shiffman et al. | 382/131 |
| 6,556,698 | B1 * | 4/2003 | Diano et al. | 382/132 |

* cited by examiner

*Primary Examiner* — Brian Le

(57) ABSTRACT

A method and system for computer-aided detection of abnormal lesions in digital mammograms is described, wherein digital films are processed using an automated and computerized method of detecting the order and orientation of a set of films. In one embodiment, anatomic features are used to detect the order, orientation and identification of a film series. In another embodiment of the invention, a technologist feeds films into the system in any order and orientation. After processing, the system provides an output on a display device to a radiologist that is in an order and orientation preferred by the radiologist. In yet another embodiment of the invention, films from one case are distinguished from films of another case. In this manner and through the use of a bulk loader, a large number of films can be stacked together and fed into the system at one time.

1 Claim, 17 Drawing Sheets

METHOD AND SYSTEM FOR AUTOMATIC IDENTIFICATION AND ORIENTATION OF MEDICAL IMAGES

CROSS REFERENCE TO RELATED APPLICATION

This application is a continuation of application Ser. No. 09/721,347, filed Nov. 22, 2000 now U.S. Pat. No. 7,146,031, a copy of which is incorporated by reference.

FIELD OF THE INVENTION

The present invention relates to the field of Computer-Aided Detection (CAD) of abnormalities found in medical images and to the field of Picture Archiving and Communication Systems (PACS). In particular, the invention relates to a method and system for determining the orientation of digitized medical images in order to enable consistent and understandable communication between a computer-aided detection system and an operator. The invention further relates to a method and system for uniquely identifying and distinguishing images from a particular case.

BACKGROUND OF THE INVENTION

Systems for computer-aided detection ("CAD") assist radiologists in the detection and classification of abnormal lesions in medical images. The purpose of such devices, as described in U.S. Pat. No. 5,815,591 to Roehrig, et. al., entitled "Method and Apparatus for Fast Detection of Spiculated Lesions in Digital Mammograms," the disclosure of which is hereby incorporated by reference in the present application, is to direct the attention of a radiologist to suspicious areas of the medical image that may reflect a threatening condition. While not a replacement for the experienced radiologist, CAD systems are designed to increase efficiency and reduce error, as a typical radiologist may be required to examine hundreds of medical images per day, which can lead to the possibility of a missed diagnosis due to human error.

Various systems and methods are currently known for computerized detection of abnormalities in radiographic images, such as those disclosed by Giger et al. in RadioGraphics, May 1993, pp. 647-656; Giger et al. in Proceedings of SPIE, Vol. 1445 (1991), pp. 101-103; U.S. Pat. No. 4,907,156 to Doi et al.; U.S. Pat. No. 5,133,020 to Giger et al.; U.S. Pat. No. 5,343,390 to Doi et al.; U.S. Pat. No. 5,491,627 to Zhang et al. These references are incorporated herein by reference as though fully set forth herein. These systems are generally referred to as Computer-Aided Diagnosis systems, Computer-Aided Detection systems, or simply, CAD systems. Such systems are believed to be particularly useful to radiologists and other medical specialists in diagnostic processes and specifically in radiologic screening procedures.

In a radiologic screening procedure, such as screening mammography, true abnormalities such as cancers are believed to occur at a typical rate of about one case per two hundred patient examinations. It is believed a CAD system, serving as an electronic reminder or second reader, can assist radiologists in obtaining higher detection rates, or higher sensitivity for abnormalities. Additionally, such CAD systems can assist radiologists in reducing the misdiagnosis rate, or lowering the false negative rate. Thus, it is believed that the use of such CAD systems will continue to increase.

Since such CAD systems typically operate on medical images in high-resolution digital format, film-based medical images ordinarily must be scanned by a high resolution scanner to convert the image data into digital form. With current CAD systems, however, we have found that systems for loading and feeding film-based medical images to the scanner are inadequate in that they tend to require too much time and effort from the user. Additionally, we have found that currently available systems do not allow the user to simply and conveniently enter case information, monitor the status of cases, and abort or adjust the processing of films being processed. For example, with currently available systems, errors in film orientation may not be detected until the radiologist views the analyzed image.

Using a light box, radiologists typically look at X-ray films such as mammograms or chest images, in a very well-defined orientation and order. For example, a mammogram typically contains four (4) films, the Cranial Caudal ("CC") and Medio-Lateral Oblique ("MLO") views of each of the left and right breasts. In most clinics the four films are arranged on a light box in a particular order and orientation, however in other clinics the films may be in a different order and orientation. The important point however, is that a radiologist in a given clinic is very accustomed to the same, unchanging order and orientation. When a computer is used to digitize, analyze, and/or display the images with or without some annotation, it is important that the computer display the same order and orientation of the film series that a doctor is accustomed to using to view the films.

One way of insuring correct order and orientation is to require that the images be input into the computer in a predefined order and orientation. This in fact is the present method used by the Computer Aided Detection (CAD) device ImageChecker, as described in U.S. Pat. No. 5,729,620 to Wang entitled "Computer-Aided Diagnosis System and Method," the disclosure of which is hereby incorporated by reference in the present application. Experience has shown, however, that this requirement places some burden on the technologist operating the system, adding to the time required to do the work, and occasionally being a source of error.

For the technologist to align all films in each case in a prescribed manner would be onerous, time consuming, and prone to error. Statistically, with any order and any orientation equally likely, the probability that a random order of the four films of a standard mammogram is correct can be expressed as $p=1/(8^4 \times 4!)=1/(4096 \times 24)=1/98,304=1.02 \times 10^{-5}$ where four (4) films can be in 8 orientations and placed in four (4) different positions in an order. Thus, it would be advantageous to input a set of films in any order or orientation and have them processed and displayed in a preferred order and orientation.

SUMMARY OF THE INVENTION

Therefore, an object of this invention is to provide an automated, computerized method of detecting the order and orientation of a film series using predetermined film identifying marks and rearranging that order and orientation into any desired order and/or orientation. In another embodiment of the invention, anatomic features are used to detect the order, orientation and identification of a film series.

The present invention provides advantages in terms of time savings as well as reduction of errors on the part of a technologist and/or user of the system. It allows a technologist to feed films into the system in any order and orientation while providing an output to a radiologist that is in an order and orientation preferred by the radiologist. It is another object of the present invention to provide a method to distinguish the films belonging to one case (i.e., one patient) from those of another case. These advantages are to be further appreciated when a large number of cases are fed into a digitizer at one time with a bulk loading input feeder (i.e., bulk loader). With a bulk loader, a large number of films, typically on the order of 100, can be stacked together and fed into the system at one time in a manner similar to high capacity paper copying machines. The stack of 100 films would contain many cases (e.g. 25) from different patients, acquired over a reasonably long period of time.

BRIEF DESCRIPTION OF THE DRAWINGS

For a better understanding of the invention, reference is be made to the following detailed description taken in conjunction with the accompanying drawings, in which.

DETAILED DESCRIPTION OF THE INVENTION

It has been found that the currently available CAD systems are lacking in their ability to facilitate the loading and feeding of films for processing. Furthermore, it has been found that such systems further lack in their ability to display digitized images to a doctor or radiologist. In particular, it has been found that providing a film feeding mechanism that holds multiple films and automatically feeds the films to the scanner greatly reduces the time and labor required to load and input films into the system. It has been found that a stack film feeder that holds a relatively large number of films makes the inputting of films much more efficient. Furthermore, it has been found that a system that allows for displaying digitized films in various orders and/or orientations provides for a more user-friendly interface.

Figure 1:
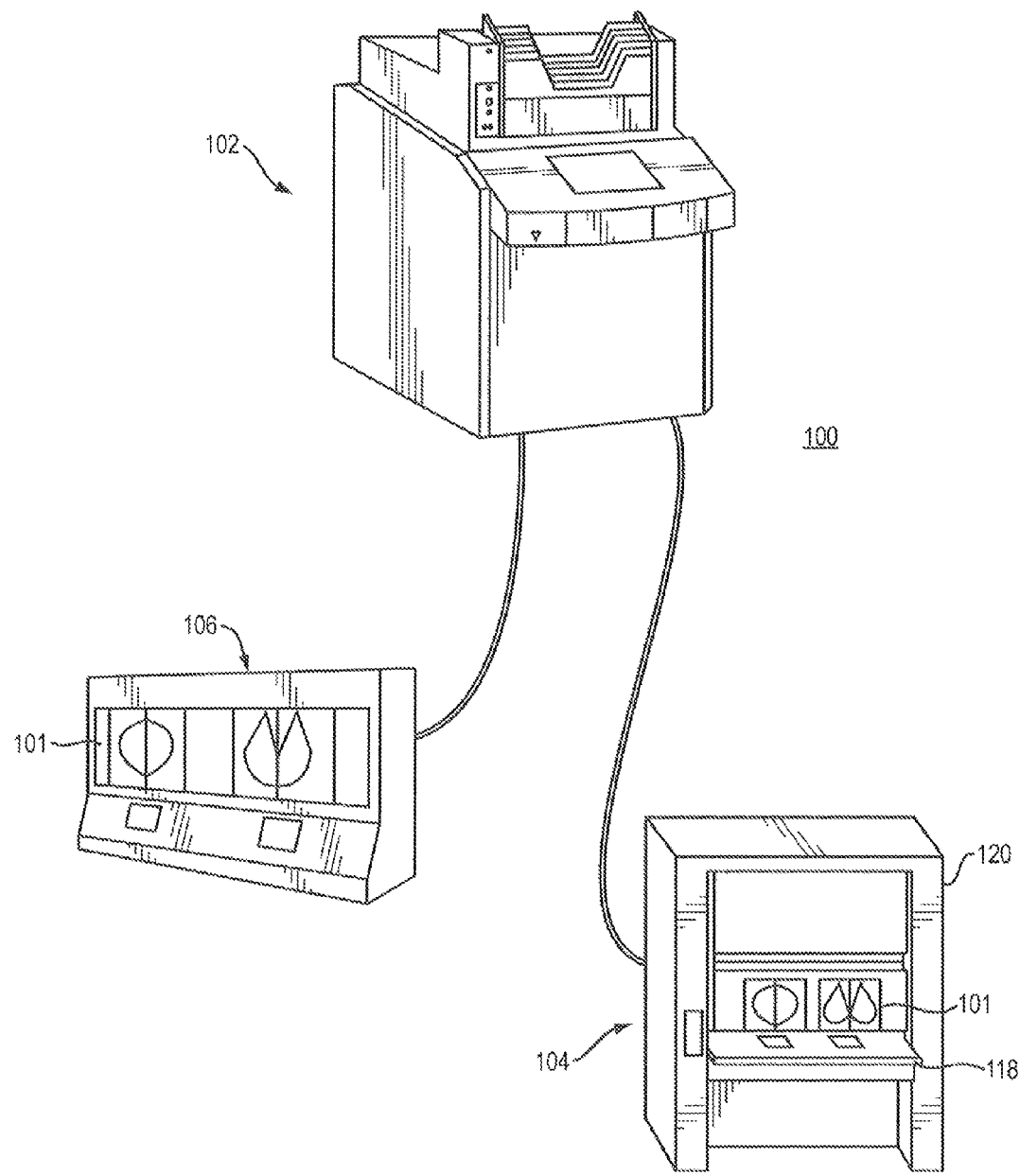
FIG. 1 is a diagram of an embodiment of a computer aided detection system of the present invention.

FIG. 1 shows an outside view of a computer aided detection (CAD) system 100, such as the Image Checker M1000 from R2 Technology, Inc., for assisting in the identification of suspicious lesions in mammograms. CAD system 100 comprises a CAD processing unit 102, an input 106, and a viewing station 104. In general, CAD processing unit 102 scans a conventionally developed x-ray mammogram 101 that is provided at input 106 into a digital mammogram image, processes the image, and outputs a highlighted digital mammogram 101D for viewing at viewing station 104.

Each digital mammogram may be, for example, a 4000× 5000 array of 12-bit gray scale pixel values. Such a digital mammogram would generally correspond to a typical 18 cm×24 cm x-ray mammogram which has been digitized at a 50 micron spatial resolution. Because a full resolution image such as the 4000×5000 image described above is not always necessary for the effectiveness of the preferred embodiments, the image may be locally averaged, using steps known in the art, down to a smaller size corresponding, for example, to a 200 micron spatial resolution.

Figure 2:
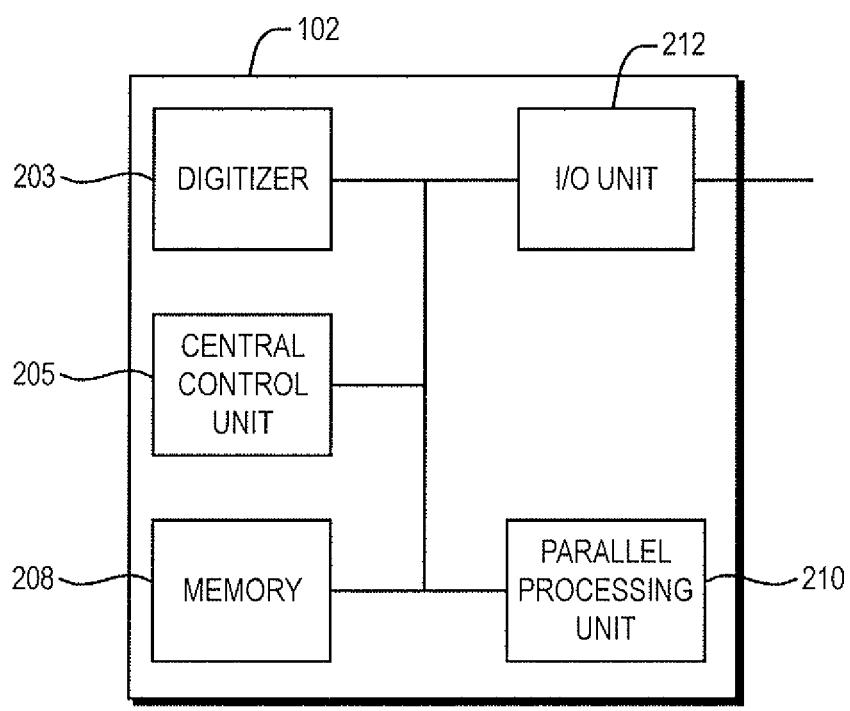
FIG. 2 is block diagram of functional units of an embodiment of the present invention.

FIG. 2 shows a block diagram of CAD processing unit 102. CAD processing unit 102 comprises a digitizer 203, such as a laser scanner with 50 micron resolution, for digitizing the conventionally developed x-ray mammogram 101. CAD processing unit 102 generally includes elements necessary for performing image processing including parallel processing steps. In particular, CAD processing unit 102 includes elements such as a central control unit 205, a memory 208, a parallel processing unit 210, and an I/O unit 212. It is to be appreciated that the parallel processing unit 210 shown in FIG. 2 may be replaced by a single processor without departing from the scope of the preferred embodiments. It is to be appreciated that in addition to the suspicious lesion detection algorithms disclosed herein, processing unit 102 is capable of performing a multiplicity of other image processing algorithms either serially or in parallel therewith.

Viewing station 104, as shown in FIG. 1, is for conveniently viewing both the conventionally developed x-ray mammogram 101 and the digital mammogram 101D that is formed by the CAD processing unit 102. The conventionally developed mammogram is viewed on a backlighting station 120. The digital mammogram is displayed on a display device 118 that may be, for example, a CRT screen. The display device 118 typically shows a highlighted digital mammogram 101D corresponding to the x-ray mammogram 101, the highlighted digital mammogram having information directing the attention of the radiologist to suspicious areas as determined by image processing steps performed by the CAD processing unit 102. In one preferred embodiment, the highlighted digital mammogram will have an asterisk (*) superimposed on those locations corresponding to suspicious lesions, and a triangle (Δ) superimposed on calcification clusters. Further information regarding CAD system 100 may be found in U.S. Pat. No. 5,815,591, supra.

It is to be appreciated that in addition to being able to display a single view of one breast, CAD system 100 may be used in accordance with the preferred embodiments to simultaneously display information related to multiple views of the same breast, similar views of both breasts, and/or views of a single breast taken at different points in time. Thus, the attention of the radiologist may be drawn to specific areas of a first mammogram image by CAD system 100, which can then be compared to corresponding areas of other views of the same breast, views of the other breast, or previous views of the same breast for making an appropriate determination.

Figure 3:
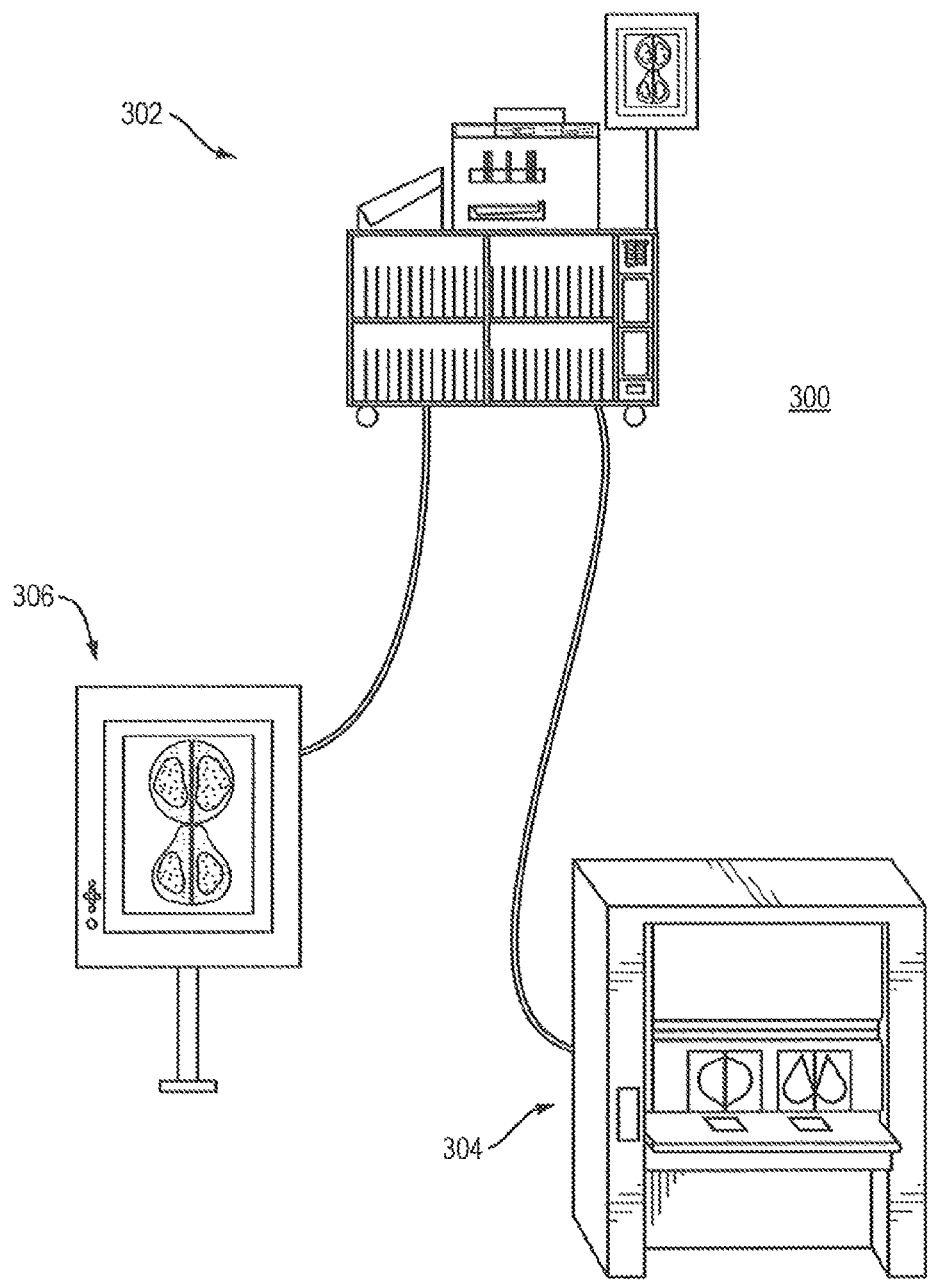
FIG. 3 is a diagram of a an embodiment of a computer aided detection system of the present invention.

According to another embodiment of the invention, a system for the detection of breast carcinoma is illustrated in FIG. 3. As shown, detection system 300 comprises a processing unit 302, a motorized viewer 304, and a wet read viewer 306. According to this embodiment, mammography x-ray films are loaded, scanned and analyzed by a processing unit 302. It is noted that the functions performed within processing unit 302 are similar to those performed within processing unit 102. One of skill in the art understands that each unit can be modified to perform identical functions. After the x-ray films are analyzed by processing unit 302, data representing regions of interest identified by the processing unit are transmitted for display to one or more viewers. In the example shown in FIG. 3, the data is be sent to motorized viewer 304, wet read viewer 306, or both.

Note that although these preferred embodiments are described with respect to detection systems that process and analyze mammography x-ray films, the present invention is readily adaptable to many other types of CAD systems. Additionally, the present invention is applicable to CAD systems which analyze other kinds of images besides x-ray films. The invention is applicable to CAD systems which process any type of film-based medical images. For example, ultrasound imaging, nuclear magnetic resonance imaging, computer tomography imaging, and scintillation camera imaging all produce images which are film-based. Additionally, film-based medical images are carried on a wide variety of film-like materials such as vellum, or any other transparent or translucent media.

Figure 4:
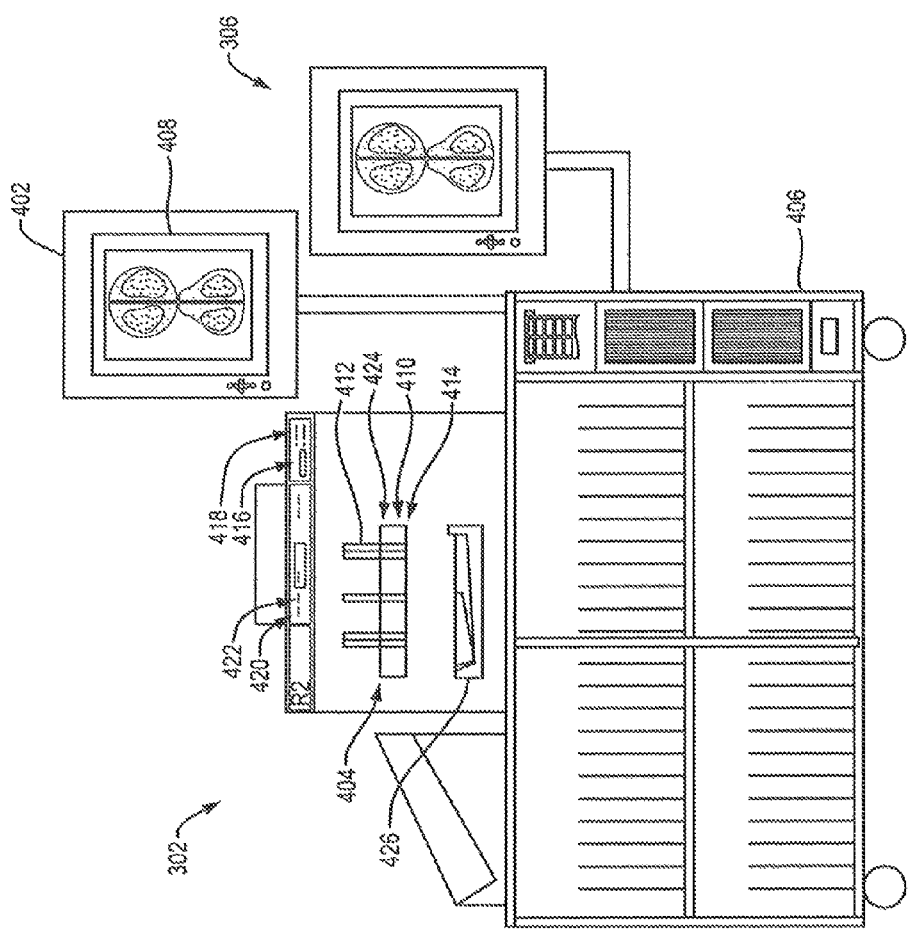
FIG. 4 is diagram of a processing unit of the present invention.

Referring now to FIG. 4, the components in processing unit 302 and wet read viewer 306 will now be described in greater detail according to a preferred embodiment of the invention. As shown, processing unit 302 houses a user interface 402, scanning unit 404, and computer 406 Note that although the scanning unit and processing unit are housed within processing unit 302, they can also be provided separately or in other combinations. In general, processing unit 406 comprises a computer-based system for the detection of anatomical abnormalities. However, processing unit 406 is generally the processor of almost any CAD system. For example, the present invention is applicable to and could be adapted to facilitate the input of film-based images into any of the CAD systems mentioned and incorporated by reference above.

As shown in FIG. 4, user interface 402 contains a display panel 408 which is a touch sensitive flat panel display and wet read viewer 306 is another touch sensitive flat panel display where both display panel 408 and wet read viewer 306 are placed in close proximity so that a user is able to access both with ease. An alternative embodiment of the invention implements a touch sensitive flat panel display to function as both the display panel 408 and the wet read viewer 306.

User interface 402 comprises an X-ray film feeding mechanism 410 which handles and feeds the films in serial fashion to scanning unit 404. Film feeding mechanism 410 comprises a stack film feeder 412 that is capable of holding a large number of films. According to a preferred embodiment of the invention, film feeding mechanism 410 is designed so as to accommodate cases of films where each case of films is made up of a number of films obtained from a single patient. For example, in the United States, it is common for a case to be composed of four mammography x-ray films. Each breast is usually imaged twice: the first image being a top view ordinarily called the Cranial Caudal view ("CC"), and the second image being a lateral view ordinarily called the Medio-Lateral Oblique view ("MLO"). The invention can accommodate cases composed of a number of films up to the maximum capacity of the stack film feeder 412.

According to a preferred embodiment, film feeding mechanism 410 comprises a stack film feeder 412 capable of feeding relatively large numbers of films. Stack film feeder 412 individually feeds films to scanning unit 404 as required during processing on either a first-in-first-out ("FIFO") basis or last-in-first-out ("LIFO") basis. Suitable stack film feeders 412 are currently or will soon be commercially available from vendors such as Konica, Canon and Abe Sekkei. Sometimes such feeders are called bulk loaders or stack loaders. Note that in embodiments where each film has its own bar code label, a bar code reader is provided in stack film feeder 412. Preferably, graphical or electromechanical user interface implemented motorized viewer 304 or wet read viewer 306 controls the organization of images processed en masse.

Additionally, film feeding mechanism 410 is designed so as to accommodate the size of films ordinarily used in a particular application. For example, in a preferred embodiment, stack film feeder 412 is designed to hold either 18 cm×24 cm, or 24 cm×30 cm films. This is accomplished by providing a film feeding mechanism with a throat that is 24 cm wide to accommodate both film sizes, in which case the 18 cm×24 cm films are rotated in software using standard digital image rotation techniques. Furthermore, a preferred embodiment of the invention utilizes a cover sheet with a tab 1010 (see FIG. 10) that protrudes beyond the other films. Thus it is necessary that the film feeding mechanism be designed so as to accommodate the protruding tab.

Transport mechanism 424 transports the films individually from film feeder 412 to scanning unit 404. After the scanning unit 404 has completed scanning a film, the film is ejected to an output film holder 426, and transport mechanism 424 feeds the next film to scanning unit 404. According to a preferred embodiment, film feeding mechanism 410 and transport mechanism 424 comprises a commonly available film feeding unit such as those commercially available from Konica, Canon and Abe Sekkei.

Scanning unit 404 generates from each x-ray film a two-dimensional mammographic image. Preferably, scanning unit 404 is a laser film digitizer and has a dynamic range and spatial resolution comparable to those of the original mammographic film which typically has a dynamic range of 10,000:1 and spatial resolution of approximately 50 microns per pixel.

Although film feeding mechanism 410 and scanning unit 404 are described herein according to certain preferred embodiments, in general many alternative types of feeding mechanisms and scanners can be used, depending on the particular application. For example, suitable scanners are commercially available from a number of vendors including Konica, Canon and Abe Sekkei.

Figure 5:
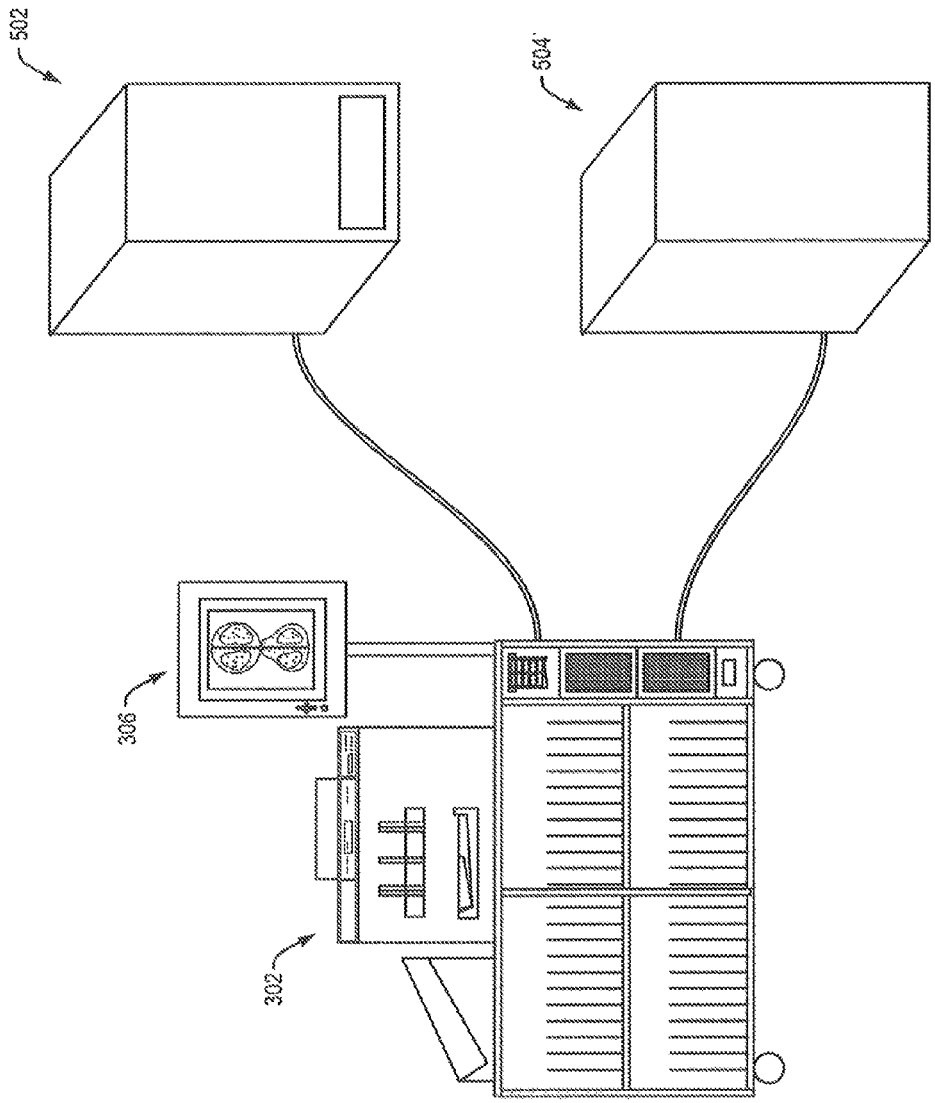
FIG. 5 is a diagram of an embodiment of a computer aided detection system of the present invention.

Additionally, certain medical images are already in digital format, such as images that were acquired with a digital medical imaging system, or that are stored in a digital image storage system. According to the invention, an example of a computer-aided detection system which receives images already in digital format is shown in FIG. 5. Although processing unit 302 is shown connected to both digital image storage system 502 and digital medical imaging system 504, in general only one source of digital image data is needed. In another embodiment of the invention, user enhancements in processing unit 302 and viewer 306 can be removed especially where the images in digital format are not prone to error. A wide variety of digital medical imaging systems currently exist. Some examples are: computer tomography systems, digital ultrasound imaging systems, scintillation camera systems, digital stimulated emission phosphor plate radiography systems, nuclear magnetic imaging systems, and digital mammographic systems. An example of a digital image storage system is disclosed in U.S. Pat. No. 5,416,602 to Inga et al., entitled "Medical Image System With Progressive Resolution" incorporated herein by reference. In the case where medical images are already in digital format, the feeding and scanning functions of the system are not needed. In such cases, the operator monitors the digital data being received by the system using the display panel, and is able to re-orient or change the order of images electronically, as will be described in greater detail below.

Figure 6:
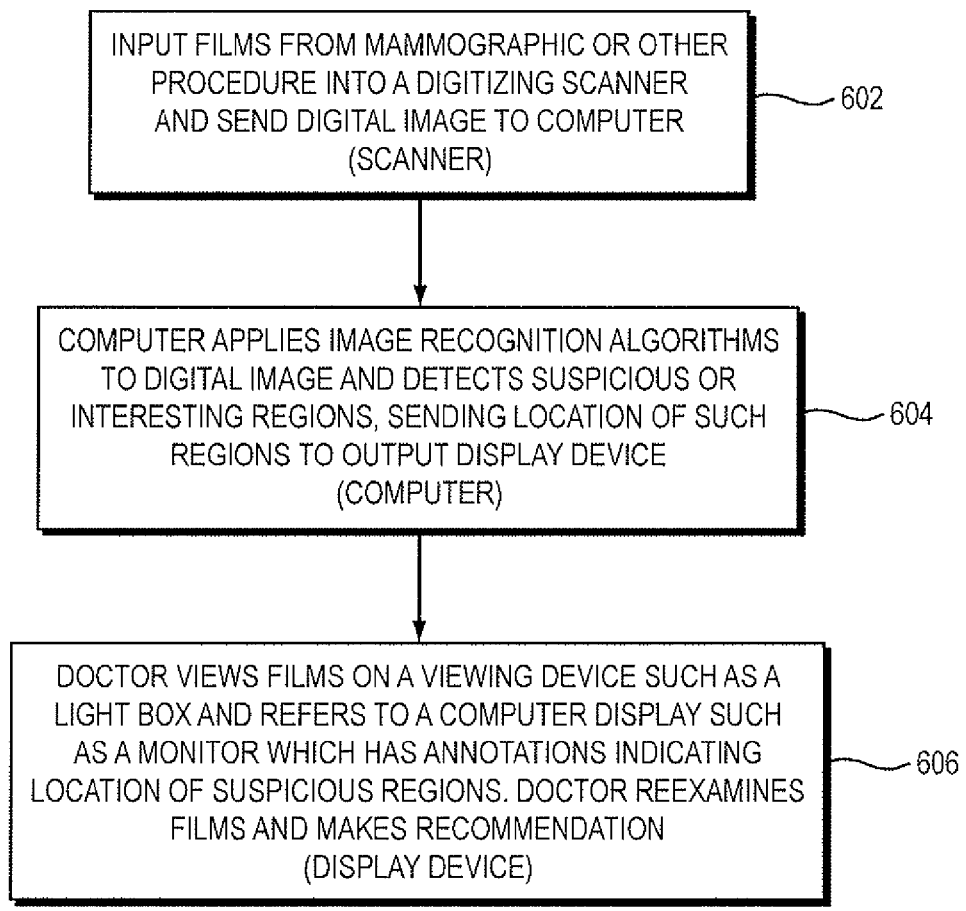
FIG. 6 is flowchart of a method of the present invention.

FIG. 6 shows the general steps performed by CAD processing unit 102 on the x-ray mammogram. Reference will be made to processing unit 102, however, one of skill in the art understands that the discussion is applicable to processing unit 302 as well. At step 602, multiple related x-ray mammograms are scanned in and digitized into digital mammograms. To create the x-rays mammograms, the breast is positioned and compressed between two plates before the X-ray is actually taken. Two views, corresponding to two approximately orthogonal orientations of the compression planes are taken, typically called Cranial Caudal (CC) view and Medio-Lateral Oblique (MLO) view. The resulting four films are developed, and digitized by the CAD system 100. The digitized image is then sent to a computer for processing at step 604.

The digital mammograms are processed at step 604 by an overall suspicious lesion detection algorithm in accordance with the preferred embodiments. The overall lesion detection algorithm performed at step 604 generates a list of locations in at least one of the digital mammogram images which correspond to suspicious lesions, i.e. possibly cancerous lesions. The algorithm operates independently on each image, without regard for what lesions are found or not found in the other images. Following step 604, the digital mammogram images and list of suspicious locations is sent for display to the viewing station 104 at step 606.

At step 606, the system of the present invention displays a digitized image of the breast mammogram with indicators overlaid on the image indicating regions of interest. At step 606, the doctor also has available the original conventionally developed mammographic films to which he can refer. After thoroughly examining the films and the digitized images, the doctor makes a recommendation.

As an alternative to the manual x-ray development following by the digitization performed at step 602, the x-ray detector, which at present is usually a film screen cassette, can be replaced by a direct digital detector such as the General Electric Full Field Digital Mammography System, and the resulting digital image fed directly to the CAD processing unit 102.

While in one embodiment the multiple related x-ray mammograms correspond to two views of the same breast, e.g., the Cranial Caudal (CC) and the Medio-Lateral Oblique (MLO) view, in another embodiment the multiple related x-ray mammograms correspond to similar views of both breasts, e.g., the MLO view of the left and right breast of a single subject. In yet another embodiment, there are three related x-ray mammograms wherein the first two are different views of the same breast, e.g., the CC and the MLO views, and the third is a view such as a the MLO view of the other breast. In still another embodiment, there is a fourth, historical x-ray mammogram corresponding to the first x-ray mammogram except that it has been taken months or years earlier in time. It is to be appreciated that there are further combinations of the above x-ray mammograms to be input into the CAD processing unit 102 that are within the scope of the preferred embodiments. It is to be further appreciated that the historical x-ray mammogram that was taken months or years earlier in time can be stored in digitized form in CAD computer memory 208, or other digital storage medium, without departing from the scope of the preferred embodiments. Alternatively, to save storage space, only a historical set of feature vectors derived from prior digital mammograms can be stored in the CAD memory 208. Indeed, the CAD memory 208 or other storage medium can contain an entire historical archive of prior digital mammograms taken of the same breast or feature vectors derived therefrom, and CAD processing unit 102 can be modified to compare any of these historical digital mammograms or feature vectors derived therefrom to the current digital mammogram.

Figure 7:
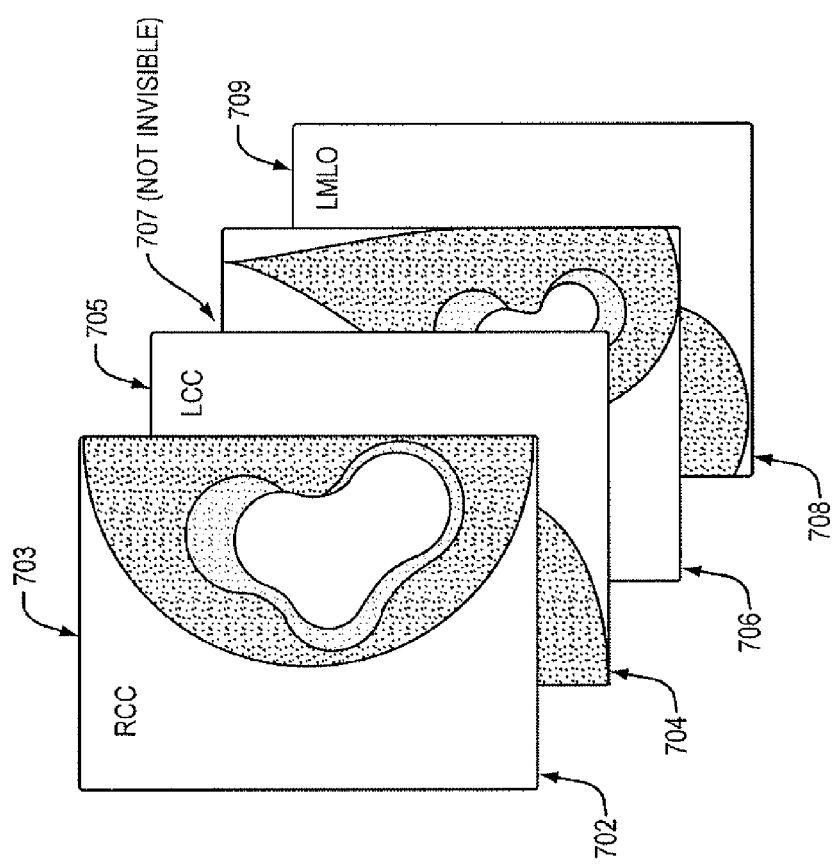
FIG. 7 is a diagram of mammographic films as used in the present invention.

The films in a film case are ordinarily arranged in a predetermined order. For example, in the United States, the four Cranial Caudal and Medial-Lateral Oblique x-ray views are ordinarily arranged in the order Right Cranial Caudal (RCC) film 702, Left Cranial Caudal (LCC) film 704, Right Medial-Lateral Oblique (RMLO) film 706, and Left Medial-Lateral Oblique (LMLO) film 708 as shown in FIG. 7. Other orders, however, may be used. In other circumstances, a case may contain 2 films (e.g., where a patient who has only 1 breast), or even just 1 film. For example, in Europe, it is common for a case to include only one image per breast, in particular the Medio-Lateral Oblique view. The actual number of films varies and cannot be predicted a priori. An embodiment of the present invention therefore determines when one case begins and ends. In another embodiment, the present invention further determines how many films are associated with a particular case.

Figure 8:
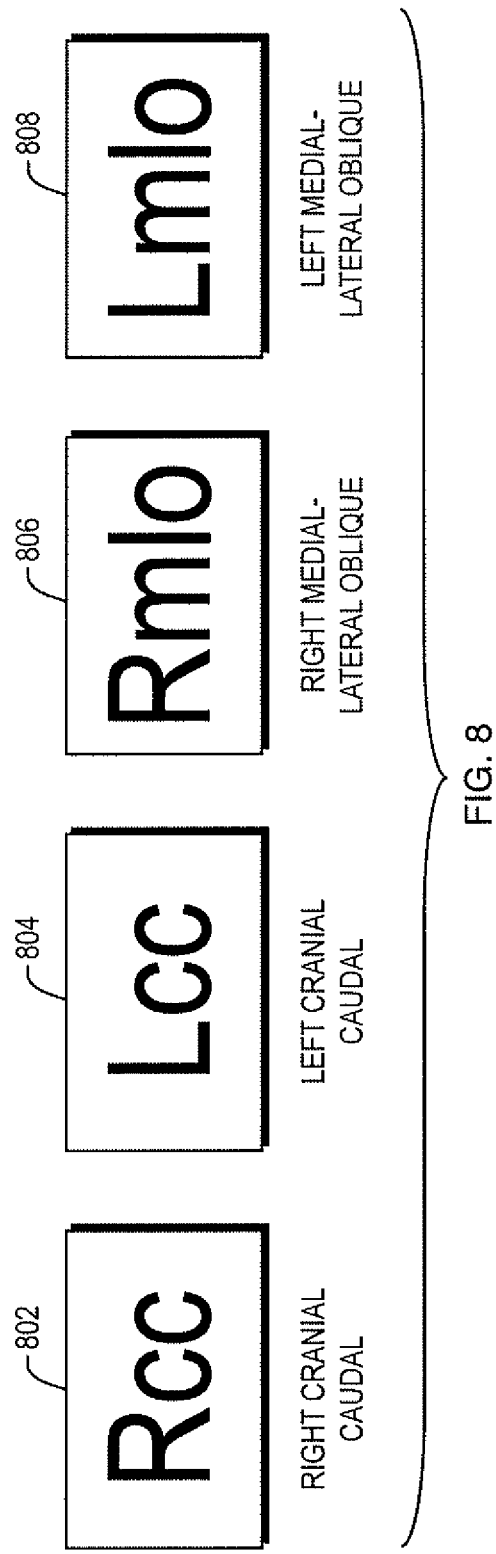
FIG. 8 is a diagram of lead markers as used in the present invention.

In accordance with the invention, a variety of methods are available for controlling the order and orientation of films. Technologists typically place lead (Pb) markers on x-ray film cassettes during an x-ray exposure. The lead markers then provide a permanent image on the x-ray film when it is developed. Technologists taking mammographic images typically use lead markers 802, 804, 806, 808 as shown in FIG. 8. RCC marker 802 produces RCC lead marker image 703 shown in FIG. 7. Similarly, LCC marker 804, RMLO marker 806, and LMLO marker 808 of FIG. 8 produce LCC lead marker image 705, RMLO lead marker image 707 and LMLO lead marker image 709 of FIG. 7. While the angular orientation of the lead markers on the films tends to be placed such that the markers are read from left to right, the orientation is, in some instances, random. The letters can also be mirror inverted if placed upside down. The placement of the lead markers, however, is specified by the American College of Radiology (ACR) standards and published in "Mammography Quality Control" by the American College of Radiology Committee on Quality Assurance in Mammography, 1992 and subsequent years, the entire contents of which are incorporated by reference. In particular, the ACR standards specify that the lead markers are to be placed "near the aspect of the breast closest to the axilla", or in practice, in the top half of the film as shown in FIG. 7 for lead marker images 703, 705, 707 and 709. In accordance with the invention, orientation and identity information is obtained by detecting the presence of lead marker images 703, 705, 707 and 709.

Figure 9:
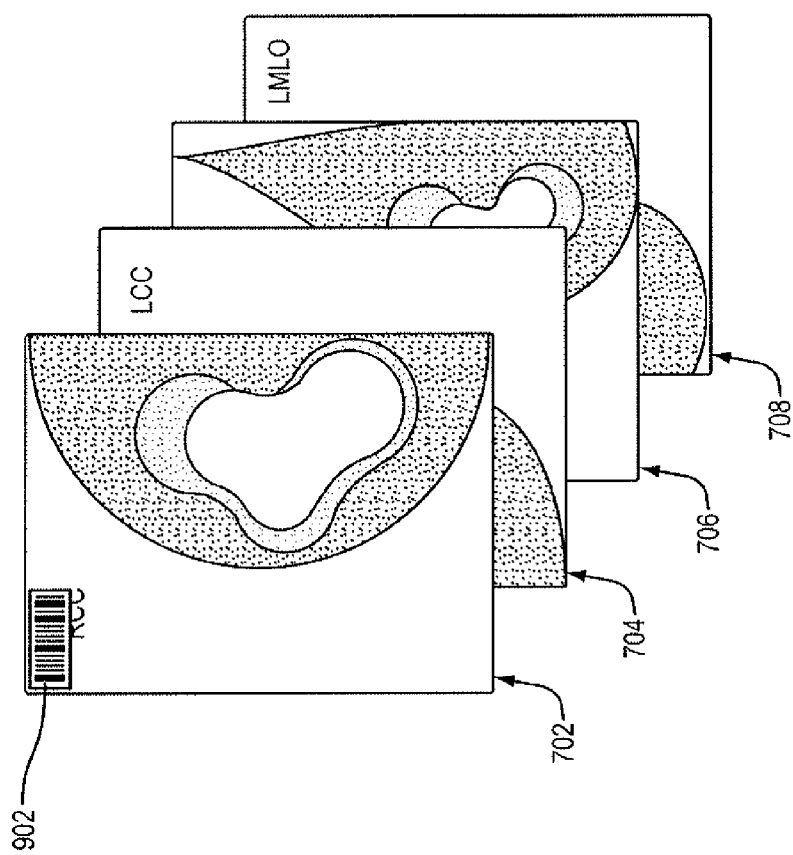
FIG. 9 is a diagram of mammographic films with a bar code label as used in the present invention.

In an embodiment of the invention shown in FIG. 9, a bar code label 902 is placed on the top left side of RCC film 702. Other bar code labels (not shown) are placed on the other films in a case. Each bar code label contains encoded or other information that is read by a machine or a technologist. While the use of bar code labels will be described, one of skill in the art will appreciate that other types of labels can be used including magnetic readable labels. Furthermore, as other types of labeling becomes available, they can also be used. In accordance with the invention, orientation and identity information is obtained by detecting the presence and/or contents of bar code labels 902.

When placing bar code labels on the films it is important that their placement does not cover or touch any necessary information. Thus it is important that the bar code labels not cover the imaged breast, lead marker images or any other information on the films. Furthermore, the performance of the present invention is enhanced if the bar code labels are not too close to any edge of the film. While keeping with ACR standards, it is suggested that bar code labels be placed in the top left side of RCC film 702 and RMLO film 706 and the top right side of LCC film 704 and LMLO film 708. One of skill in the art appreciates that the position of the labels can be changed as standards and other factors change.

Further orientation and identity information is obtained by detecting the presence of lead marker images 703, 705, 707 and 709 in conjunction with detection of the bar code labels. Algorithms that have been found effective in detecting the lead markers and bar code labels are described further below.

An embodiment of the invention provides a method for separating one case (i.e., films associated to one patient) from another case in an automatic, computerized way. The need to separate cases arises when using stack film feeder 412 (see FIG. 4). Stack film feeder 412 typically can hold many cases, such as 100 films corresponding to 25 cases, and sequentially feed them into a scanner which digitizes the images and sends the digital images to a computer for further processing. For a technologist to align all films in each case in a prescribed manner is onerous, time consuming, and prone to error using methods in the prior art. Advantageously, the present invention provides a savings in time needed to feed films into a CAD system and further reduces errors in the feeding of films.

Figure 10:
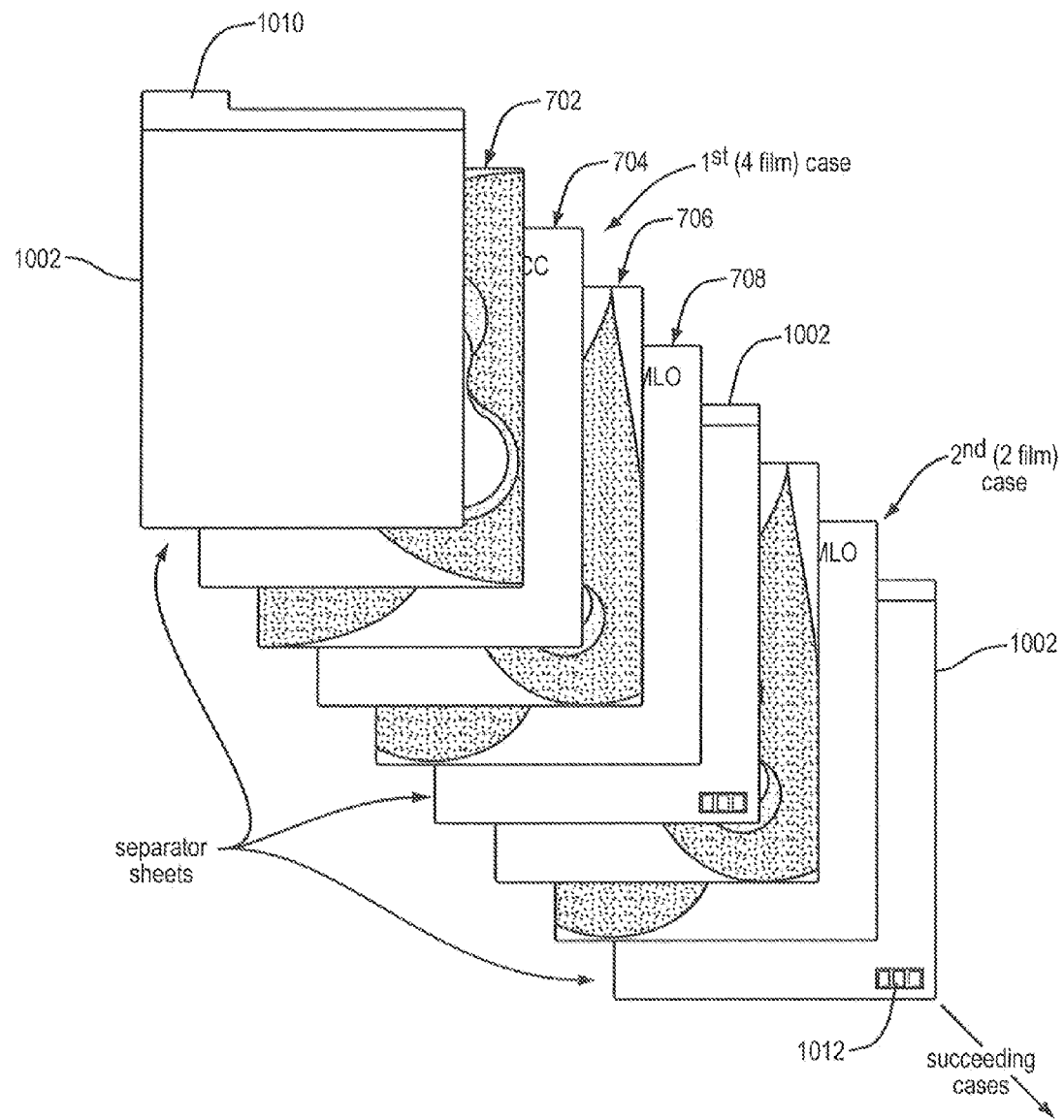
FIG. 10 is a diagram of mammographic films with a cover sheet as used in the present invention.

In particular, a method is provided for separating and grouping films associated with a particular patient. According to an embodiment of the invention as shown in FIG. 10, a different type of film is used as a cover or separator sheet 1002 which is inserted before each case to facilitate organization of the cases by the technologist. Further, a second type of cover sheet (not shown) is provided for missing views such as in the case of a missing breast due to a mastectomy or because a view was not imaged. While the requirements for the number of films in a case varies, stack film feeder 412 of FIG. 4 must accommodate the particular requirements of the implementation.

As shown in FIG. 10, a case identification label 1012 that associates the films in the case with a specific patient is placed on the lower right hand side of cover sheet 1002. In another embodiment of the invention, cover sheet 1002 has tab 1010 on which case identification label 1012 is placed. Other locations are also appropriate without deviating from the present invention. As shown in FIG. 10, case identification label 1012 is a bar code label that can be read by a bar code reader. Alternatively, textual or encoded information is placed on label 1012. A patient identification label (not shown) can also be placed on the film to explicitly identify the patient or provide textual information about the patient.

Advantageously, only the cover sheet 1002 has case identification label 1012 affixed on it; and each case, whatever the number of films it contains, has a cover sheet placed on top by the technologist before inserting it into the stack film feeder 412. The bar code is scanned either by the film scanner or by a separate bar code scanning device before the patient films are scanned and digitized. The information represented by the bar code label is then associated with a particular set of films between the cover sheet to which the label is affixed and the next cover sheet. Whenever the system of the present invention detects the presence of cover sheet 1002 or the presence of case identification label 1012, the system assumes that the films that follow immediately thereafter constitute a case that is different from those that precede the separator sheet. Thus, cover sheet 1002 or case identification label 1012 serves as a first-film indicator.

In other embodiments of the invention, case identification label 1012 is placed on the first film of a case or on each film of the case. In FIG. 4, a bar code reader is mounted in film feeding mechanism 410 to read the cases as they are being fed in by the stack film feeder 412. Alternatively, scanning unit 404 could be adapted to read the bar code label from each film.

Other forms of indicating the first film of a case are possible without deviating from the teachings of the invention. For example, as shown in FIG. 9, lead marker image 703, 705, 707 and 709 can be read using an optical character recognition (OCR) algorithm. An OCR algorithm will be described below. Where the films are known to be stored in a specified order, the method of the present invention searches for a first occurrence of the lead marker image that indicated the first film.

Where the order of the films is not known, a first-film indicator can be determined by loading a number of films and identifying the associated lead marker images until a complete set of films is loaded such as a set of RCC, LCC, RMLO and LMLO films. The first film of this set is then identified as the first film of the previously loaded case. It is noted that although embodiments are described using a first-film indicator, the teachings can be extended to use other indicators such as a second film indicator, third film indicator, or last film indicator.

Figure 12:
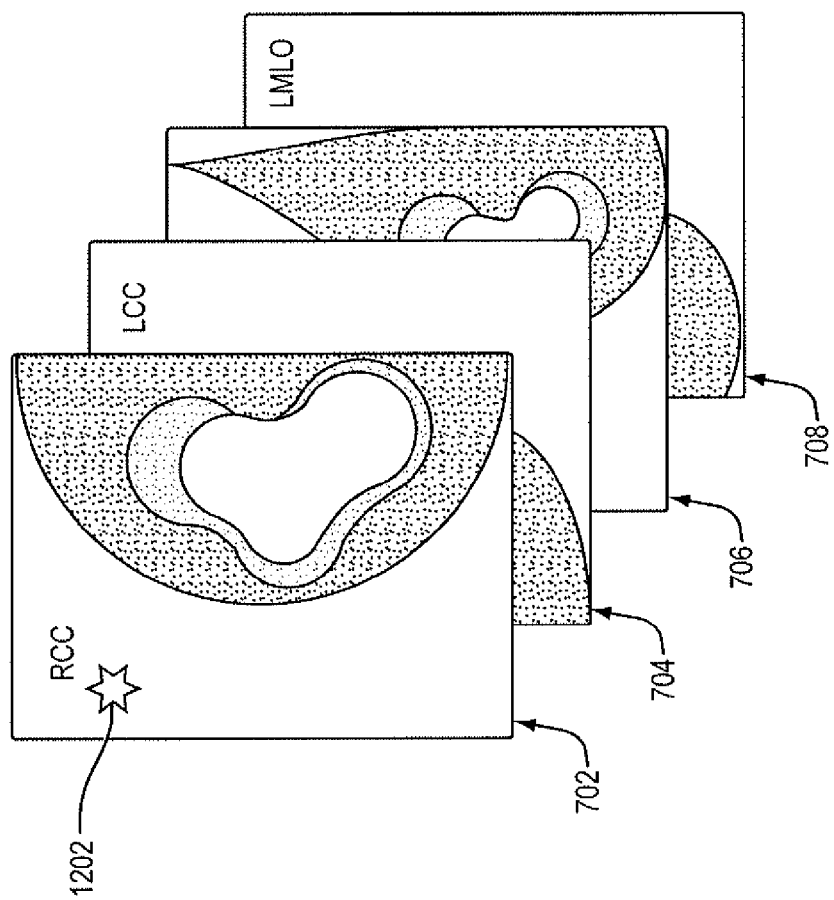
FIG. 12 is a diagram of mammographic films with a unique identifier as used in the present invention.

In another embodiment of the invention as shown in FIG. 9, case identification label 902 is used as a first-film indicator. In yet another embodiment of the invention shown in FIG. 12, a unique mark 1202 is placed on a first film of a case. Unique mark 1202 can be a specially shaped hole such as can be made with a one-hole paper punch. Unique mark 1202 is then used as a first-film indicator. Where a unique mark 1202 is used, the method of the present invention implements a technique such as pattern matching which will be further described below. Further modifications include creating a unique identification number and associating it with a bar code which is then saved with the films. The bar code can then be used for retrieval of information at a later time.

The modifications just described provide the further advantage that more cases can be loaded at one time since no space is occupied in the scanner feeder by cover sheets 1002. However, where a stack containing no cover sheets is used, a technologist loading and unloading the system of the present invention needs to take particular care to physically separate individual cases in the stack. Thus errors can be reduced by providing a separator sheet 1002 of a conspicuous color or a cover sheet 1002 with a tab 1010.

Figure 11:
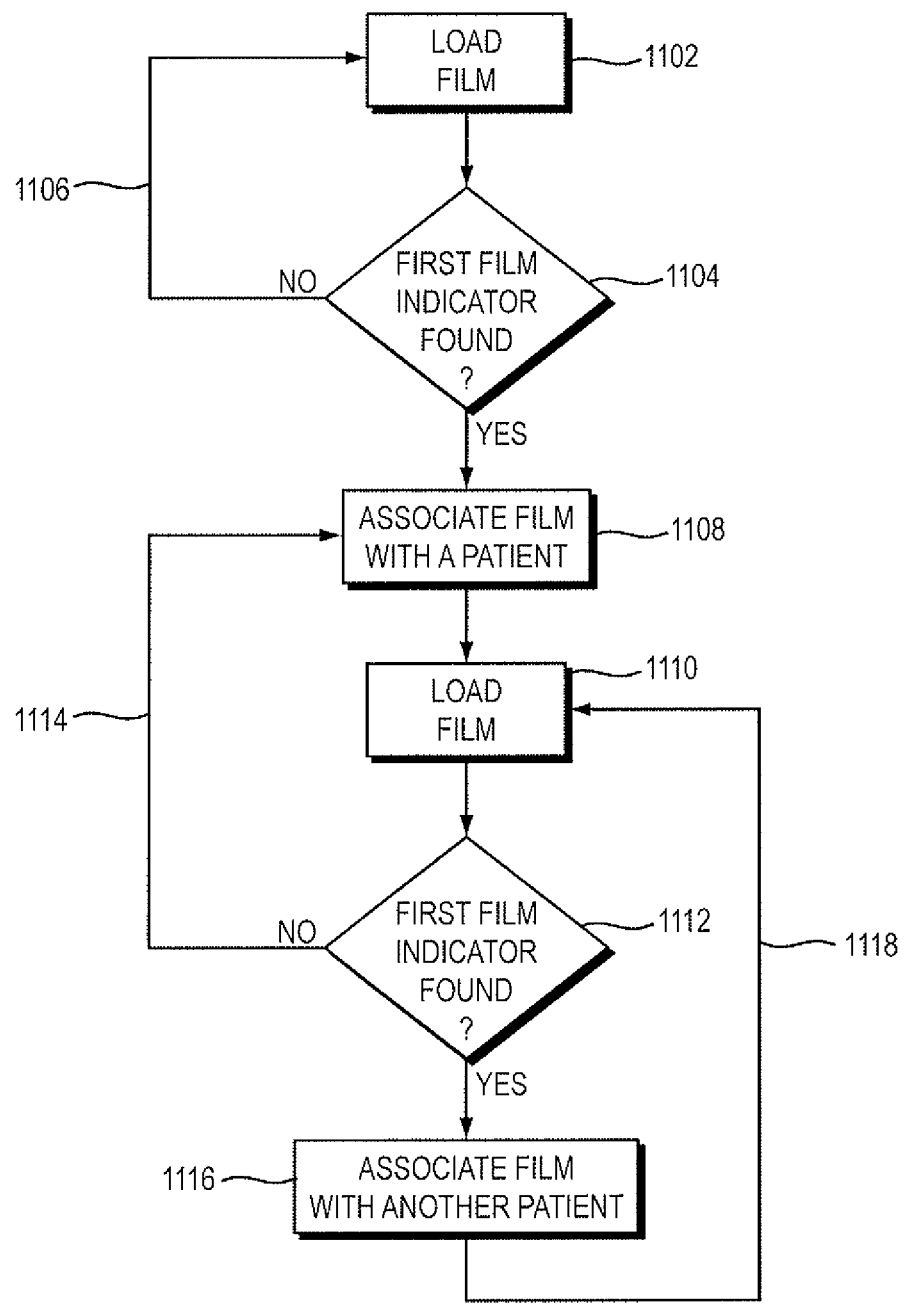
FIG. 11 is a flowchart of a method for determining a case according to an embodiment of the invention.

Referring to FIG. 11, there is shown a flowchart for an algorithm of an embodiment of the present invention. At step 1102 a film is loaded into the system of the present invention. The system then searches for a first-film indicator on the loaded film at step 1104. If a first-film indicator is not found, the method again loads another film as shown by loop 1106. If a first-film indicator is found, the film is associated with a patient at step 1108. Another film is loaded at step 1110. Another search is made for a first-film indicator at step 1112. If no first-film indicator is found, the film that was just loaded is associated with the same patient as shown by loop 1114. If a first-film indicator is found, the film that was just loaded is associated with another patient at step 1116. Another film is then loaded as shown by loop 1118. One of skill in the art understands that loop 1118 can be repeated many times to complete the loading of a large stack of films. One of skill in the art further understands that modification of the method as shown in FIG. 11 is possible without deviating from the teachings of the invention.

After the case is read through the scanner, the case films are put into a patient envelope along with the separator sheet containing the bar code. The information associated with a particular case is then directed to viewing station 104 (or motorized viewer 304) associated with a patient identification number. Subsequently, a doctor can review the films on viewing station 104. Furthermore, patient films can be hung on an integrated or nearby light box. Upon hanging of the films, automated retrieval of information is accomplished by scanning the bar code on the separator sheet, for example. The display unit then associates that number with the corresponding space or "slot" on viewing station 104. The viewing station can then display the correct digital images when the doctor requests information on the films from an identified slot.

A further object of the present invention is to determine the orientation of a film. Useful information about orientation can be obtained from anatomic or geometric features. For example, mammographic images are rectangular in shape (typically either 18×24 cm or 24×30 cm). Furthermore, so as to maximize the imaging area of a radiographic image, the chest wall of a patient is usually along one of the longer edges of a mammographic film. This information can then be used in an embodiment of the invention to determine the left or right orientation of a film.

Figure 13:
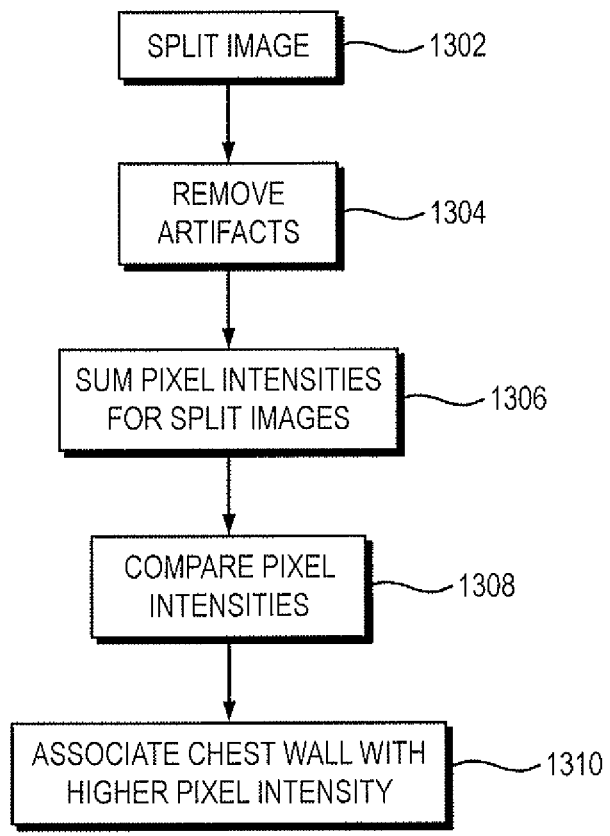
FIG. 13 is a flowchart of a method for determining a chest wall side of a mammographic film according to an embodiment of the invention.

As shown in the flowchart of FIG. 13, a digitized radiographic image is split length-wise at step 1302 into two halves where each half is either 9×24 or 12×30 depending on the film used. At step 1304, substantially all artifacts are removed. Artifacts include unexposed regions due to masking and unexposed regions along the image edges. At step 1306, the pixel intensities in the two halves are summed. One side of the image will have a higher average pixel intensity than the other due to the attenuation of the x-rays by the breast. The pixel intensities are then compared at step 1308. The side with the larger average pixel intensity (greater than some threshold value) is determined at step 1310 to be the chest wall side. In another embodiment, the side with a pixel intensity greater than a predetermined threshold is associated with the chest wall side. Digitization of the images with a pixel size of 200 microns has been found to be adequate for the purposes described here.

Those skilled in the art understand that other anatomical features are common in mammographic images. More generally, those of skill in the art understand that other types of radiographic images such as chest x-rays contain common anatomical features which can be used to provide orientation and identity information. In an embodiment of the invention, the chest wall as imaged on a mammographic film is identified to provide orientation information.

As previously discussed, radiologists and other doctors become accustomed to viewing radiographic films in a particular orientation. By implementing the method of the present invention and identifying the chest wall of a patient, a left or right orientation of a film can be determined so as to present films on viewing station 104 in a preferred orientation. For example, where a doctor is accustomed to viewing RCC films with the chest wall on the right-hand side, a digitized image can then be rotated, if necessary to present the digitized image in a preferred left/right orientation. Those of skill in the art understand that there exist many algorithms for rotating a digital image.

Figure 14:
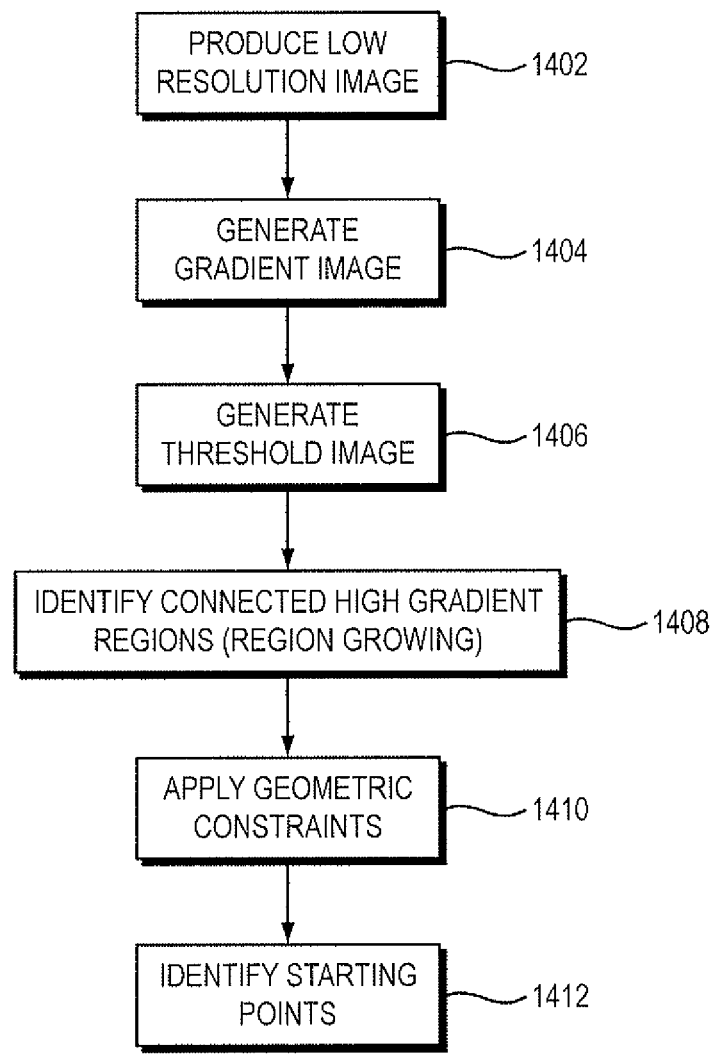
FIGS. 14-16 are flowcharts of a method for identifying characters imprinted on a mammographic film according to an embodiment of the invention.
Figure 15:
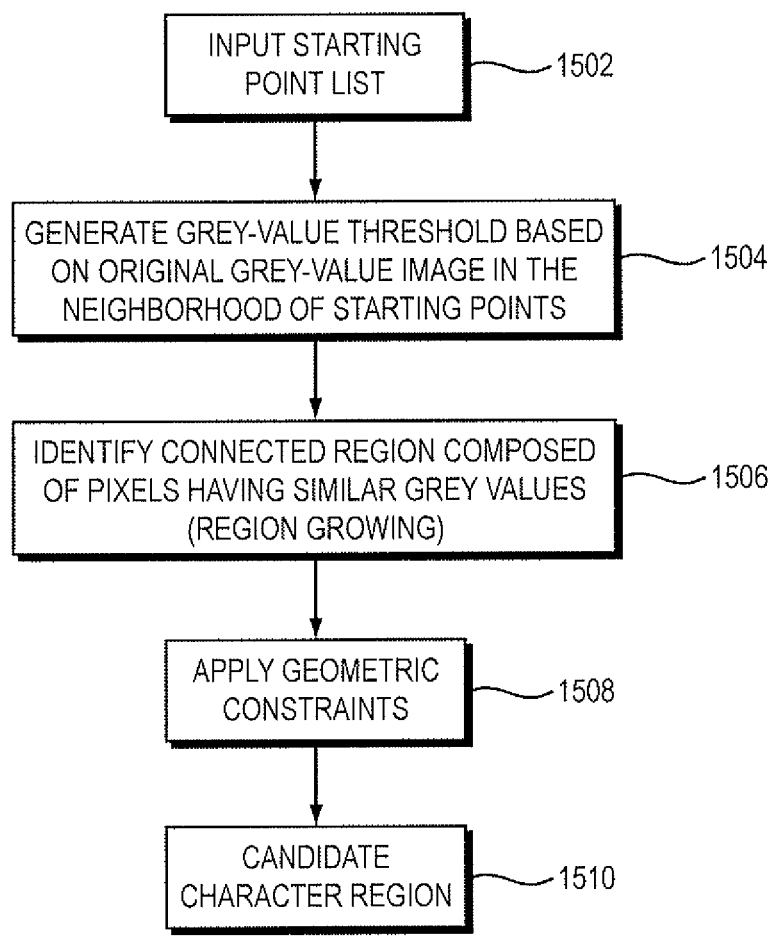
Figure 16:
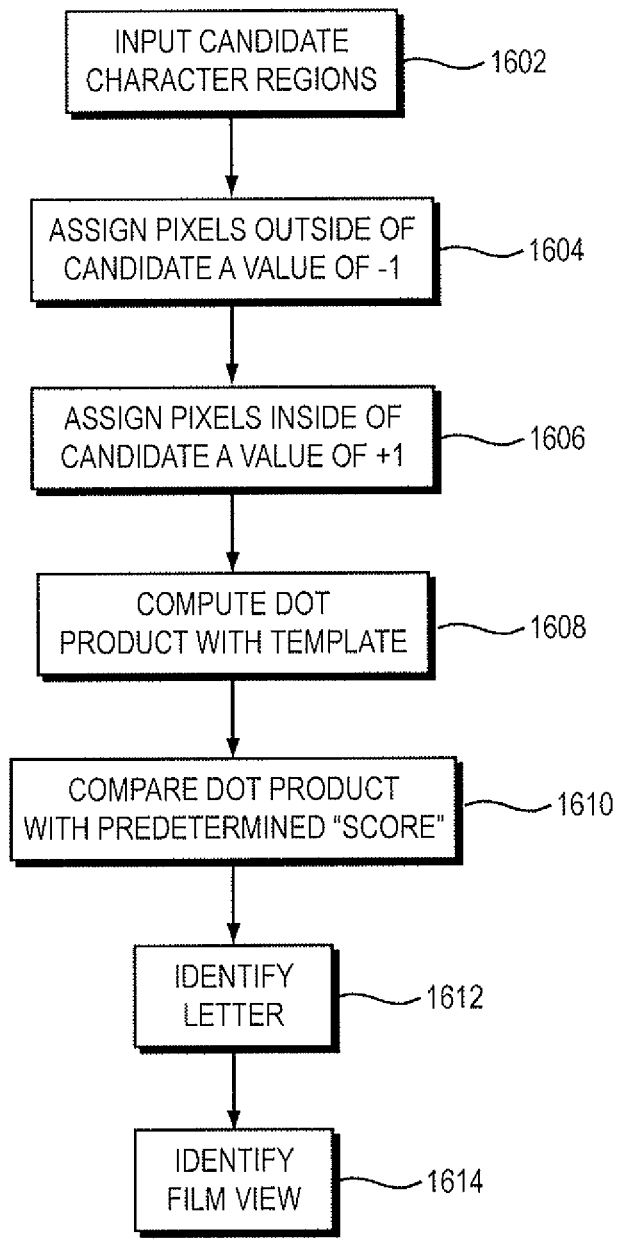

In another embodiment of the invention, the previously described lead markers 802, 804, 806 and 808 and the associated lead marker images 703, 705, 707 and 709 are used to derive further orientation information. A method for identifying a lead marker image 703, 705, 707 or 709 on a film is shown in FIGS. 14-16. The method involves optical character recognition (OCR) where the standard optical character recognition problem is composed of three stages: digitization, segmentation and recognition. As digitization has already been discussed, FIGS. 14-16 address segmentation and recognition.

As is evident from FIGS. 7 and 9, the image produced by the lead marker on the film is composed of distinct white characters on a dark background. In a preferred embodiment, these characters are not in contact with any other features in the image. Also in a preferred embodiment, the characters do not overlap the edges of the film or the edge of a label such as a case identification label or a patient identification label. The segmentation process is composed of a number of smaller tasks including finding starting points for locating characters, thresholding, growing regions and extracting candidate characters.

FIG. 14 is a flowchart for a method for identifying candidate starting points. As noted in conjunction with FIG. 1, a digital mammogram typically has a spatial resolution of 200 microns. This is usually considered to be a high resolution. For purposes of certain steps of an optical character recognition algorithm, an image with a lower resolution such as 400 microns or 1600 microns is adequate. Accordingly, at step 1402, a low resolution image is produced from the high resolution digitized image using methods known in the art. At low resolution, all characters in the lead marker image tend to be segmented as a single region. At step 1404, a gradient image is generated from the low resolution image. A gradient image identifies changes in pixel gray values. Since lead marker images 703, 705, 707 and 709 are typically bright images on a dark background, a high gradient exists in going from a dark background to the bright images and vice versa. In one embodiment, a standard 3×3 Sobel gradient filter is used to create a gradient image (i.e., changes in pixel gray values). The Sobel gradient filter is described at page 501 in "Digital Image Processing" by William Pratt, Wiley-Interscience Publishers, 2nd Edition which is incorporated by reference. Other methods that create a gradient image can also be used in the present invention.

At step 1406, a histogram-based low resolution gradient threshold image is generated. This low resolution gradient threshold image contains threshold values to be used as points of interest for the gradient image region growing of step 1408. The threshold values are determined by analyzing histograms of local gradient values. The histograms are composed of structure indicating character edges (high gradient values) and flat image regions (low gradient values). The thresholds are selected such that these two regions are distinguished in the subsequent region growing step 1408. High gradient features in the image which are not characters will be removed using simple geometric constraints as will be described for step 1410.

Using the points of interest, connected regions having high gradients are identified at step 1408. Step 1408 is sometimes described as region growing in the prior art. Pixels surrounding the points of interest are compared to a predetermined gradient threshold. Pixels exceeding the predetermined gradient threshold are then combined with the points of interest to form regions of interest. This process is then repeated for as long as there are pixels surrounding the regions of interest that exceed the predetermined gradient threshold. As a result, each region of interest that is formed includes all contiguous pixels that exceed the predetermined threshold.

At step 1410, geometric constraints are applied to the regions identified in step 1408. Lead markers are commercially available and are therefore of known size. Thus, a geometric constraint can be imposed on the size of the region of interest. In particular, the region of interest is compared to a minimum and maximum predetermined size; and where a region of interest is within the range between the minimum and maximum size, the region of interest is identified at step 1412 as a candidate starting point. The candidate starting point identifies an outline of a letter or set of letters such as used in lead markers. The steps as shown in FIG. 14 are repeated until all candidate starting points are identified.

Having identified candidate starting points that may correspond to outlines of letters, the next task is to generate candidate character regions by filling in potential outlines. FIG. 15 is a flowchart for a method for identifying candidate character regions. At step 1502, a list of candidate starting points is input. At step 1504, a gray-value threshold is calculated based on the distribution of pixels of the original gray-value image in the neighborhood of each starting point. For example, in the high resolution gray scale image, a region of predetermined size and shape (i.e. a square or rectangle) is created to surround the candidate starting location. Then, in this region, the distribution of gray-scale values is evaluated. In an embodiment, the difference between a minimum pixel value and a maximum pixel value in the pixels within the region of predetermined size and shape is compared to a predetermined contrast value. This is essentially a minimum contrast requirement for detecting images produced by lead markers for example. Where the range of gray scale values does not exceed the predetermined contrast value, a sufficient contrast does not exist and the candidate starting location is removed from further consideration. Where the range of gray scale value exceeds the predetermined contrast value, a region growing process is performed at step 1506 in which similar gray scale values surrounding the candidate starting location are identified. Region growing constraints are applied at step 1508 similar to those of step 1410. At this point, the candidate character regions that may comprise the lead marker image have been filled in and are identified at step 1510.

FIG. 16 is a flowchart for a method for determining whether the candidate character regions are letters from a lead marker image. At step 1602, the candidate regions are input. A binary image of each candidate region is then produced at steps 1604 and 1606. A value of −1 is assigned to pixels outside the candidate region and within a predetermined region (i.e. a square or rectangle as in step 1504) surrounding the candidate character region at step 1604. A value of +1 is assigned to pixels inside the candidate character region at step 1606. Similarly, a binary image of a series of templates is used. The templates are predetermined and can produced ahead of time. The templates are letters or a sets of letters corresponding to lead marker images. For example, four sets of letters can be "RCC," "LCC," "RMLO" and "LMLO" such that there nine distinct template letters including "R," "R$^{-1}$", "L," "L$^{-1}$," "C," "M," and "O" where the −1 superscript indicates parity inversion (i.e., mirror image). As with the binary candidate character region, the template is assigned a values of −1 outside the template and +1 inside the template.

It is to be appreciated that when the candidate character region lines up perfectly with the template, pixels with values of +1 in the candidate character region line up with pixels with values of +1 in the template and pixels with values of −1 in the candidate character region line up with pixels of −1 in the template. It is to be further appreciated that if the numerical values assigned to the lined up pixels are multiplied together, all the products would be positive (i.e., $(+1) \times (+1) = +1$ and $(-1) \times (-1) = +1$). Where there is misalignment or lack of overlap of the character region with the template, the numerical values assigned to some of the lined up pixels would have opposite sign and many negative products could result (i.e., $(-1) \times (+1) = -1$ or $(+1) \times (-1) = -1$). Thus, the sum of all the products is a measure (or score) of how well the candidate character region lines up with the template with the highest score being achieved in case of perfect alignment and lower scores being achieved in other cases. Mathematically, this type of multiplication and addition is described as a dot product. For example, the binary values of the character region can be expressed as a vector R and the binary values of the template can be expressed as a vector T and the dot product of the vectors R and T yields the score, S.

Referring back to FIG. 16, at step 1608, a dot product is computed of the binary image of each candidate character region with a series of templates. Where the candidate character region lines up with the template, the resultant dot product (or score) is maximized. It is to be further appreciated that where the candidate character region and the template do not line up, pixels with values of +1 and −1 will multiply thus reducing the dot product or score. At step 1610, the dot product is compared to a predetermined score. Where the predetermined score is exceeded, the candidate letter is identified as the letter on the template whose dot product is then being computed. At step 1614, a film view is identified using the identified letters or groups of letters. For example, where the letters "R," "C," "C" or the set of letters "RCC" are identified, the film view is identified as the Right Cranial Caudal view. Similarly, the Left Cranial Caudal, Right Medio-Lateral Oblique and Left Medio-Lateral Oblique film views are identified.

In the foregoing description of step 1608, the orientation of the candidate letter and the template are assumed to be the same. This, however, is not always the situation. Thus, in a preferred embodiment, the orientation of each template is rotated through 360 degrees relative to each candidate letter; and steps 1608-1612 are repeated at different orientation angles to identify letters. As noted above, mirror-images of the template are also considered because the lead marker images may have been flipped by the technologist taking the image. Again, the mirror image template can be rotated through 360 degrees while performing the steps of 1608-1812. In another embodiment, the orientation of the letters is determined by minimizing the moment of inertia of a candidate letter. The angle of the axis through the center of mass of a candidate letter which produces the minimum moment of inertia provides an orientation for the lead marker image. The template is then rotated to match this orientation and the steps of 1608-1612 are performed.

Figure 17:
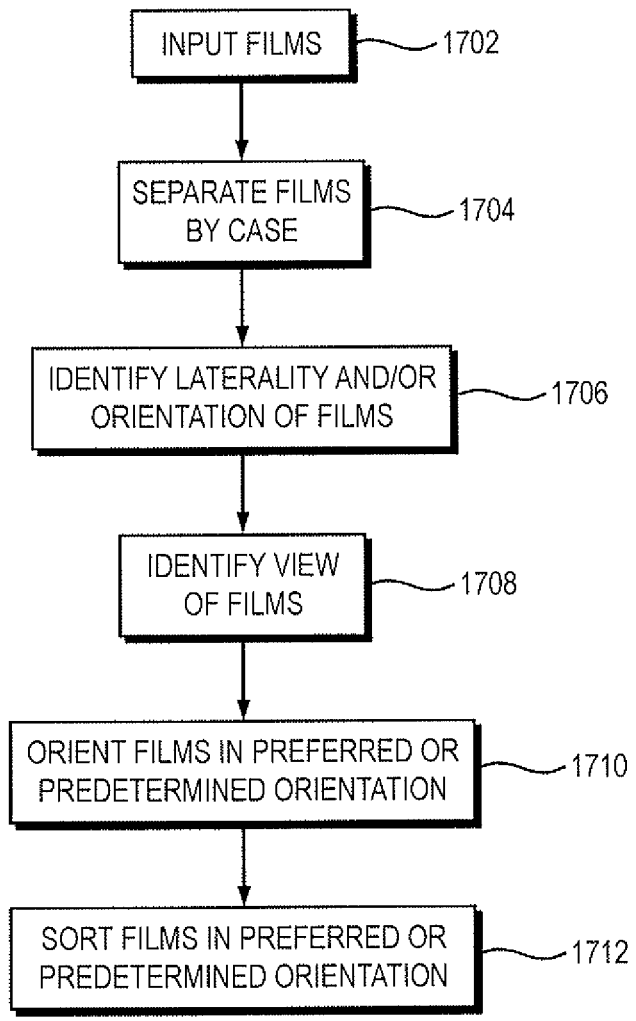
FIG. 17 is a flowchart of a method for displaying digitized images in a preferred or predetermined order and/or orientation.

The flowchart of FIG. 17 shows a method for presenting films in a predetermined or preferred order and orientation. At step 1702, the digitized images are input. The digitized images are separated by case at step 1704 using, for example, the method of FIG. 11; laterality (i.e., left/right side) and orientation information is derived at step 1706 using, for example, the method of FIG. 13; and, the specific film view is identified at step 1708 using, for example, the methods of FIGS. 14-16. At step 1710, the digitized images are then oriented in a preferred or predetermined orientation; and, at step 1712, the digitized images are sorted in a preferred or predetermined order. Thus, in operating a CAD system of the present invention, the films may be inserted into the input mechanism such as film feeding mechanism 410 in any order and orientation; and the system will determine the orientation and order of the film images and display them on a display device such as display panel 408 in a preferred or predetermined order and orientation.

The methods of FIGS. 14-16 have been described for identifying images produced by lead markers, however, one of skill in the art understands that other images can be identified. For example, textual and other technical information is often included on the sides of the images or on patient identification labels. The methods just described can also be used for identifying such information. Furthermore because patient identification labels are placed on known regions within the films, patient identification labels can be used to identify the order and orientation of the films as well as to read in the information contained on the patient identification films.

As described above, visual cues and other information are used to determine the orientation and identity of the various films produced in x-ray mammography. Visual cues are obtained by information inherent in an image such as the breast and chest wall characteristics in a mammography film. Also, anatomical features derived from the films are used to determine orientation and identity. Information in an image can include the nipple or the skin outline. Furthermore, identifying markers placed on the films are identified to provide orientation and identity information. Identifying markers can take the form of lead marker images, bar code labels, patient identification labels or other types of markers as may be developed. Still further, case separation is achieved by, among other methods, placing and identifying case separation cues such as special separator films between films of interest to provide information to the system or special markers on the first film of a case.

When the method of FIGS. 14-16 is applied to a large number of actual mammograms, errors occur when a film view cannot be identified or is identified incorrectly. An error rate on the order of 5% is experienced. To reduce errors it is helpful to factor into the determination of orientation and location of labels other information that may be available such as:
- the chest wall is either on the left side or right side of the film;
- the lead marker is in the top half of the film;
- the lead marker image and the patient identification label directions are defined relative to the center of the chest wall (i.e., either clockwise or counter-clockwise);
- the lead marker image is clockwise from the chest wall for right films;
- the lead marker image is counter clockwise from the chest wall for left films;
- the position of the patient identification label is always opposite the chest wall;
- the position of the patient identification label is always in the top or bottom of the film; and
- the patient identification label is clockwise from the chest wall.

One of skill in the art understands that as specifications or assumptions are changed, certain key information can, nonetheless, be extracted from the changes. Redundancy occurs when two items of information contain some of the same information. For example, the identification of the film views of four films in a case provide the necessary film view information for all the films. Identification of three film views in a case, however, also provides the necessary film view information for all the films because the identity of the fourth film can be inferred. Thus, the identity of the fourth film provides redundant information.

Some information input to the CAD system is subject to human error and some is not. In an embodiment of the invention, information not subject to human error supercedes information that is subject to human error. For example, if a film side (L or R) as indicated by the lead marker is inconsistent with the label position, the side determined from the label position is preferred. In another embodiment, collective information is preferred over single-film information. For example, if three films imply the identity of a fourth film and this result conflicts with the fourth film's lead marker, then the 3-film information is preferred.

Incomplete and thus erroneous information arises when one or more lead markers is not fully identified. For example, a lead marker may not be found on a film. This occurs for primarily two reasons: the radiation technologist placed the marker on or near a high gradient edge (i.e., the patient identification label); or the exposure of the radiographic film is so long that the marker is "burned through" rendering little contrast on the film. Furthermore, it is possible for a technologist to place the lead marker over a patient identification label to obscure the lead marker image. For example, for right side films, the patient identification label is in the upper left hand corner and, therefore, competes for space with the lead marker image. In an embodiment of the invention, this problem is alleviated by deriving information from the case context. For example, where an RCC view is missing, but the RMLO view has been identified, the unidentified view can properly be labeled as RCC. Also, if the label position is determined, the orientation can be derived. For example, where a patient identification label is identified on the lower right hand side of a right side image, the orientation is determined.

Even if the direction of the patient identification label is not identifiable, the digitized image can be processed as it was scanned and subsequently processed after further information is obtained or derived. Further processing can include, for example, determination of the chest wall as described for FIG. 13. After such processing, the up/down orientation may remain ambiguous but further derived information, such as the determination of a lead marker image, can make such a determination possible. In such a situation, it may not be necessary to fully identify the lead marker image (i.e., whether it is "RCC" as opposed to "LCC"); basic information that a lead marker is in a particular location regardless of its identity may suffice to determine orientation.

In gathering further error reduction and redundancy information, it has been observed that two lead markers may not be identified for the two right side views because of the proximity of the lead markers to the patient identification label on the left side of the films. If two fully-identified films are found to be in their default order then it can be assumed that missing films are also in their default order. For example, suppose the films are scanned in the order [x1, LCC, x2, LMLO] where x is unknown. In such circumstances, it is reasonable to assume that x1 is RCC and that x2 is RMLO and process the case as such.

It has further been observed that a missing lead marker and a missing patient identification label may occur. In such a situation, the missing film is processed in a clockwise orientation (i.e., the label is clockwise from the chest wall). In such a situation, however, the up/down orientation is ambiguous, but may be derived from further processing.

Conflicting information also creates errors. For example, conflicting information occurs when more than one film in a case is found with the same lead marker. Such a situation occurs when there are extra films in a case or if two films have duplicate markers. Thus, there are two distinct possibilities for duplicate lead markers: 3 identical sides or 3 identical views. Assuming one film is incorrectly labeled, an incorrect film can be identified by the fact that its label direction will be inconsistent with its lead marker side while the other film with the same lead marker will be consistent with its label direction. If the label direction is not found for the films with duplicate markers, then the scan order is used to recover from this potential error. A correct identity can be inferred based on the position provided the other three films in the correct scan order.

While preferred embodiments of the invention have been described, the descriptions are merely illustrative and are not intended to limit the present invention. For example, although the embodiments of the invention described above were in the context of a system for computer-aided diagnosis and detection of breast carcinoma in x-ray films, those skilled in the art will recognize that the disclosed methods and structures are readily adaptable to broader application. For example, the invention is applicable to many other types of CAD systems for detecting other types of anatomical abnormalities, including but not limited to chest x-ray, magnetic resonance imaging, and nuclear medicine.

What is claimed is:

1. An automated method for separating multiple digitized radiographic images, comprising the steps of:

receiving in a computer system multiple digitized radiographic images;

identifying by the computer system a plurality of case separation indicators embedded in the multiple digitized radiographic images, each case separation indicator including a marker identifying an image as a first image of a case; and grouping in the computer system the multiple digitized radiographic images into multiple cases using the plurality of case separation indicators, wherein the case separation indicator is received prior to a number of radiographic images in a case.

* * * * *